United States Patent
Karpen (10) Patent No.: US 6,450,652 B1
(45) Date of Patent: Sep. 17, 2002

(54) NEODYMIUM OXIDE DOPED MOTOR VEHICLE WINDSHIELD AND SAFETY GLAZING MATERIAL

(76) Inventor: Daniel Nathan Karpen, 3 Harbor Hill Dr., Huntington, NY (US) 11743

( * ) Notice: Subject to any disclaimer, the term of this patent is extended or adjusted under 35 U.S.C. 154(b) by 0 days.

(21) Appl. No.: 09/865,096

(22) Filed: May 24, 2001

(51) Int. Cl.[7] .......................... G02B 27/00; C03C 3/095
(52) U.S. Cl. ........................ 359/603; 359/601; 359/884; 501/26; 501/62
(58) Field of Search ................................ 359/603, 601, 359/884, 883, 885; 501/26, 60, 64, 62, 66, 67, 51, 53, 55

(56) References Cited

U.S. PATENT DOCUMENTS

| | | | |
|---|---|---|---|
| 3,354,025 A | 11/1967 | Ayhanian | 161/199 |
| 3,714,055 A | 1/1973 | Matsuura et al. | 252/300 |
| 4,093,468 A * | 6/1978 | Boitel et al. | 501/4 |
| 4,315,186 A | 2/1982 | Hirano et al. | 313/111 |
| 4,390,637 A * | 6/1983 | Daiku | 252/478 |
| 4,395,653 A * | 7/1983 | Graff | 313/112 |
| 4,441,046 A * | 4/1984 | James | 313/112 |
| 4,454,446 A | 6/1984 | Kobayashi | 313/48 |
| 4,470,922 A | 9/1984 | Denker et al. | |
| 4,521,524 A | 6/1985 | Yamashita | |
| 4,769,347 A | 9/1988 | Cook et al. | |
| 5,076,674 A | 12/1991 | Lynam | 359/274 |
| 5,077,240 A | 12/1991 | Hayden et al. | 501/67 |
| 5,548,491 A | 8/1996 | Karpen | 362/61 |
| 5,830,814 A | 11/1998 | Combes | 501/70 |
| 5,844,721 A | 12/1998 | Karpen | 359/603 |
| 5,849,649 A | 12/1998 | Poole | 501/26 |
| 5,858,894 A | 1/1999 | Nagashima et al. | 501/64 |
| 5,958,811 A | 9/1999 | Sakaguchi et al. | 501/71 |
| 5,961,208 A | 10/1999 | Karpen | |
| 6,358,873 B1 * | 3/2002 | Stewart | 313/25 |

FOREIGN PATENT DOCUMENTS

GB 762678 12/1956

OTHER PUBLICATIONS

Weidert, F.; "Das Absorptionsspektrum von Didymglasern bei verschiendenartiger Zusammensetzung des Grundglasses"; Zeithschrift f. wiss. Photo,; 1921–22; vol. 21; pp. 254–264.

Dannmeyer F.; "Das Neophanglas als nautisches Hilfsmittel bei unklarer Sicht"; Die Glashutte; 1934; No. 4; pp. 49–50. (also includes translation of above articel).

Bouma, P.J.; The Colour Reproduction of Incandescent Lamps and "Philiphane Glass"; Philips Technical Review; 1938; vol. 3; pp. 27–29.

* cited by examiner

Primary Examiner—Mohammad Sikder
(74) Attorney, Agent, or Firm—Alfred M. Walker (57) ABSTRACT

Motor vehicle windshields and safety glazing material, suitable for use as motor vehicle windshields and safety glazing material for automobiles, trucks, buses, motorcycles, locomotives. sport utility vehicles, all terrain vehicles, and vans. The motor vehicle windshields and safety glazing material contains Neodymium Oxide, a rare earth compound. The Neodymium Oxide filters out the yellow portion of the spectrum, reducing glare. Incorporation of yellow light in the spectrum desaturates colors and reduces contrast. Improvement in contrast and a reduction in glare permits, for example, a motor vehicle driver to better discriminate the contrast of objects when there is no daylight and the only illumination is artificial. For drivers, in particular, elimination of the yellow light lessens eye strain currently resulting from light emitted by the conventional headlights of oncoming vehicles during hours of darkness. Neodymium Oxide can also be added to safety glazing materials for use in bullet resistant shields.

27 Claims, 4 Drawing Sheets

NEODYMIUM OXIDE DOPED MOTOR VEHICLE WINDSHIELD AND SAFETY GLAZING MATERIAL

FIELD OF THE INVENTION

The invention relates to the development of a new reduced glare motor vehicle windshield and safety glazing material, and in particular, a new motor vehicle windshield and safety glazing material that will be capable of providing improved vision at the levels of illumination necessary to see while driving during daylight or at night, and to eliminate much of the discomfort experienced by drivers seeing the headlights of motor vehicles coming from the opposite direction. It will also reduce the glare from the rising or setting sun while traveling east or west. The new Neodymium Oxide doped motor vehicle windshield and safety glazing material will be capable of improving the color rendition of viewed objects under all conditions of illumination. It can be used on new motor vehicles, and for older vehicles as a replacement for the motor vehicle after-market.

DOCUMENT DISCLOSURE PROGRAM

The application for patent is based on a disclosure received by the United States Patent and Trademark Office on May 27, 1999, as Disclosure Document No. 456,992, under the Document Disclosure Program.

BACKGROUND AND THEORY OF THE INVENTION

It has long been recognized that the visual discomfort from headlights of oncoming vehicles from the opposite direction and from the rising or setting sun is a major problem that has been unrecognized up to this time.

One such proposed solution was to install polarizers on motor vehicle headlights. The concepts behind such technology have been summarized by Shurcliff (Shurcliff, William A., *Polarized Light Production and Use, Harvard University Press*, Cambridge, Mass., 1962, pp. 129–133). To avoid the absorption of light that is inevitable in dichroic polarizers, a number of inventors have proposed systems using specially designed pile of plate polarizers (see, for example, MARKS, British Patent No. 762,678, 1956). Difficulties involving bulk, fragility, a tendency to become cloudy, polarization defect, and manufacturing costs, prevented the implementation of this technology.

The present invention extends the concept of a color corrected motor vehicle headlight from an incandescent sealed beam or tungsten halogen lamp, as disclosed in U.S. Pat. No. 5,548,491 (KARPEN, 1996), and from a Neodymium Oxide doped rear view mirror, as disclosed in U.S. Pat. No. 5,844,721 (KARPEN, 1998), and also from a color corrected high intensity discharge motor vehicle headlight, as disclosed in U.S. Pat. No. 5,961,208 (KARPEN, 1999), which are hereby incorporated by reference, to a Neodymium Oxide doped motor vehicle windshield and safety glazing material. (U.S. Pat. No. 5,830,814, (1998)), discloses glass composition suitable for the manufacture of glazings for use in the architectural field or for fitting in motor vehicles. These compositions contain the following constituents, expressed in weight percentages, defined by the following limits: $SiO_2$ 69 to 75%, $Al_2O_3$ 0 to 3%, CaO 2 to 10%, MgO 0 to 2%, $Na_2O$ 9 to 17%, $Fe_2O_3$ (total iron) 0.2 to 1.5%. These compositions can also contain fluorine, as well as oxides of zinc, zirconium, titanium, and less than 4% barium oxide, the sum of the percentages of the alkaline earths remaining equal to or below 10%.

SAGAGUCHI et al. (U.S. Pat. No. 5,958,811, (1999)), discloses an ultraviolet and infrared radiation absorbing glass having excellent ultraviolet radiation absorbing power and a bronze or neutral gray tint which is suitably used as window glass for automobiles or motor vehicles and also as a window glass for construction materials is provided. The glass comprises in % by weight, basic glass components comprising 65 to 80% $SiO_2$, 0 to 5% $B_2O_3$, 0 to 5% $Al_2O_3$, 0 to 10% MgO, 5 to 15% CaO, 10 to 18% $Na_2O+K_2O$, and coloring components comprising 0.20 to 0.50% total iron oxide (T-$Fe_2O_3$), in terms of $Fe_2O_3$, 0 to 3% $CeO_2$, 0.025 to 6.0% $La_2O_3$, 0 to 2% $TiO_2$, 0.0002 to 0.005% CoO, 0.0002 to 0.005% Se, 0 to 0.01% NiO, and 0 to 1% $SnO_2$, wherein 5 to 25% of said T-$Fe_2O_3$ is terms of $Fe_2O_3$ is FeO.

HAYDEN et al. (U.S. Pat. No. 4,470,922, (1991)) discloses a strengthenable, high Neodymium Oxide containing glass comprising 40 to 60% $Si_O2$, and 10 to 30% Neodymium Oxide, and various other inorganic compounds in minor amounts.

KOBAYSHI (U.S. Pat. No. 4,454,446, (1984)) discloses a cathode ray tube for a light source with a face plate being made of a glass material containing the rare earth oxides $Nd_2O_3$ and $Pr_2O_3$, so that satisfactory color light and contrast are obtained even under sun light.

MATSUURA (U.S. Pat. No. 3,714,055, (1973)) discloses glass color filters for use in color photography under white and warm white fluorescent lights prepared from a glass composition, containing various glass components one of which is Neodymium Oxide in the amount of 0.3 to 2.5 percent.

YAMASHITA (U.S. Pat. No. 4,521,524, (1985)), discloses contrast enhancement filters for color CRT display devices which have between 5 and 40% Neodymium Oxide as a component of the glass.

COOK et al. (U.S. Pat. No. 4,769,347, (1988)) discloses contrast enhancement filter glass for color CRT displays which has between 10 and 25% Neodymium Oxide as a component of the glass.

HIRANO et al. (U.S. Pat. No. 4,315,186, (1982)) discloses a reflective lamp with a Neodymium Oxide doped front lens section fused to a reflective mirror section. HIRANO restricts the amount of Neodymium Oxide in the front lens section to a range of 0.5 to 5.0 percent by weight. At an amount of Neodymium Oxide above 5 percent, the difference in the thermal expansion coefficient between the resultant glass material and that constituting the reflective mirror becomes too great, so that it becomes difficult to fuse the front lens section to the reflective mirror base.

AYKANIAN (U.S. Pat. No. 3,354,025, (1967)) discloses color gradated laminates. Laminated panels and interlayers are disclosed wherein the interlayer used to bond the laminate is characterized by having a pigmented band or gradient across the interlayer. The pigmented band tapers in thickness for a maximum thickness at one edge to a minimum thickness at the other edge to give a uniform color gradient. Safety laminates generally comprise two or more pellucid panels with a plastic transparent layer interposed between each of the panels. The interlayer conventionally used is composed of a plasticized polyvinyl acetal resin and is generally extruded or formed into films having thicknesses of 0.015 inches and greater. The most important application for laminates of this type are windshields for automotive, military vehicles, and aircraft.

Although the use of dyes to produce a gradual fading color band serve to reduce the effects of glare and heat, it has been found that overall improvement in these properties may be obtained by the use of pigments incorporated into the body of the sheet. The pigment concentration can vary within wide limits depending on the transmission desired after lamination. To obtain the desired effect, the transmission of the darker portion of the laminate should be less than 25 percent and more preferably less than 10 percent with a minimum of 1 percent.

In the present invention, anti-glare materials are incorporated into the glass of the windshield and safety glazing material, not just the interposed laminate. Additionally to distinguish the art of AYKANIAN, the entire windshield, and not just a band across the top of the windshield, has the anti-glare compound.

LYMAN (U.S. Pat. No. 5,076,674, (1991)) discloses a reduced first surface reflectivity electrochemichromic rearview mirror assembly. In the art of LYMAN, Neodymium Oxide is one of a number of possible materials of high refractive index in a triple layer thin film stack.

What the present invention does, and what the prior art failed to do, is to reduce the amount of yellow light transmitted through the Neodymium Oxide doped motor vehicle windshield and safety glazing material, since reducing the amount of yellow light in the spectrum improves color saturation and reduces glare. The approach of the present invention to the problem of visual discomfort and visual disability is to add Neodymium Oxide, a rare earth oxide, to the glass of the windshield and safety glazing material to absorb yellow light and reduce its presence in the light spectrum. The Neodymium Oxide can be added to the windshield in an amount up to 0.0225 grams per square centimeter of glass area to satisfy the requirement of 49 Code of Federal Regulations 571.205 and ANSI/SAE Z26.1-1996, as approved by ANSI on Aug. 11, 1997, which requires a regular (parallel) luminous transmittance of not less than 70 percent of the light. For safety glazing materials for use in bullet resistant shields, the Neodymium Oxide can be added in an amount up to 0.04 grams per square centimeter of area to satisfy the requirements of 48 Code of Federal Regulations 571.205 and ANSI/SAE Z26.1-1996, as approved by ANSI on Aug. 11, 1997, which requires a combined regular (parallel) luminous transmittance at normal incidence through both the shield and the permanent vehicle glazing of not less than 60 percent.

The Insurance Institute for Highway Safety has letters in its files concerning glare from motor vehicle high intensity discharge lamps, even though at the time of the filing of this patent application, the absolute number of these vehicles is very small, according to a verbal telephone conversation with Mike Cammisa, a staff member, on or about Jan. 26, 1998. As more vehicles are equipped with high intensity discharge lamps, or use them as daylight running lamps, the glare problems are going to increase. In addition, Vivek Bhise, at Ford Motor Company, and Michael Perel, at the National Highway Traffic Safety Administration, in telephone conversations with the inventor on or about Feb. 2–3, 1998, have both expressed concern about the glare from daylight running lamps.

To explain the importance of the present invention, a discussion of its Neodymium Oxide component is as follows:

Neodymium Oxide is a rare earth element, having an atomic number of 60 and an atomic weight of 144.24. It combines with oxygen to form Neodymium Oxide, $Nd_2O_3$, having a molecular weight of 336.48.[1]

The elucidation of the rare earths in elemental form took the better part of the nineteenth century, and the properties of Neodymium that are important to the lighting art in this patent application were known even before Neodyium was prepared in metallic form. In 1803, Klaproth discovered the mineral ceria. It was also found about the same time by Berzelius and William Hisinger.[2] This mineral proved to be a mixture of various rare earth oxides. In 1814, Hisinger and Berzelius isolated Cerium Oxide from the ceria earth.[3] In 1839, Moslander found the rare earth lanthana in the ceria.[4] In 1841, Moslander treated lanthana with dilute nitric acid, and extracted from it a new rose colored oxide which he called didymium, because as he said, it seemed to be "an inseparable twin brother of lanthana".[5]

It was believed that didymium was a mixture of elements. The separation proved difficult. In 1882, Professor Bobuslav Brauner at the University of Prague examined some of his didymium fractions with the spectroscope and found a group of absorption bands in the blue region ($\lambda$=449–443 nanometers) and another in the yellow $\lambda$=590–568 nanometers).[6] In 1885, Welsbach separated didymium into two earths, praseodymia and neodymia.[7] The neodymia has the aborption bands in the yellow region. The neodymia earth is Neodymium Oxide.

The spectra of rate earths became of great interest to a number of investigators. The most impressive feature about the spectra of rare earth ions in ionic crystals is the sharpness of many lines in their absorption and emission bands. As early as 1908, Becquerel realized that in many cases these lines can be as narrow as those commonly observed in the spectra of free atoms of free molecules.[8]

However, many solids that are of practical use today are amorphous or glassy rather than crystalline. That means that in the immediate vicinity of like ions in such substances is similar, but that there is no long range order in the sample. Rare earth ions can be easily incorporated into many glasses. It was noted quite early that in glasses, as might be expected, the most prominent feature of the rare earth crystal spectra, the extreme sharpness of the optical lines, vanishes.

From a simplified point of view, a glass is a supercooled liquid. It can therefore be assumed that the spectra of rare earth ions in glasses will be similar to those of rare earth ions in liquids. The spectra in liquids show a "crystal field splitting", although with very wide lines. This is an indication that the rare earth ions in a liquid are surrounded by a near neighbor shell of ligands—similar to the configuration found in a solid and the same for every dissolved rare earth ion, and that the uncorrelated structure is only beyond the near neighbor shell. If the near neighbor coordination in a liquid is the same as in a solid, one can understand the similarity in the magnitude of the crystal field splitting and the solution. In glasses the rare earth ions are incorporated as oxides. From the reasoning just cited one can expect that rare earth spectra in glasses to be similar to those of the stable oxide modification of the particular rare earth ion; this expectation is verified by experimental findings.[9]

The absorption of an ion may undergo a fundamental change when placed in different surroundings. A great variety of colors which can be obtained with divalent copper, cobalt, or nickel ions have been attributed to the differences in co-ordination numbers and the nature of the surrounding atomic groups. The change of an ionic bond into a covalent bond produces a completely different absorption spectra. The close interdependence of light absorption and chemical change is not surprising when it is realized that the electrons which are responsible for the visible absorption are also responsible for the chemical interactions and the formation of compounds.

The case, however, is different with the rare earth compounds. Their colors depend on the transitions taking place in an inner, well protected, electronic shell, whereas the chemical forces, as in other elements, are restricted to deformations and exchanges of electrons within the outer electronic shells. Consequently, the color of Neodymium compounds remains practically independent of the nature of the atoms in which the element is linked. The hydrated salts are amethyst colored, just as the water free salts, the ammoniates, the hydroxide, or the oxide. Chemical changes affect color only to a minor extent.[10]

A number of studies of Neodymium Oxide containing glasses have been conducted to examine the absorption spectra. Weidert conducted a systematic study in 1922. Samples of pure Neodymium Oxide were made available for the first time, relatively fee of contamination from impurities such as praseodymium.[11] Spectra were published showing the absorption of yellow light in a broad band from 565 to 598 nanometers.[12]

According to Rosenhauer and Weidert, the absorption spectra of the $Nd^{+3}$ ion in glasses signals any change of the structure which affects the stability of the glassy state. Composition changes which increase the tendency of a glass to devitrify also blur the normally sharp absorption bands of the $Nd^{+3}$ ions. The absorption indicators can be used therefore for studying the compatibility of oxide systems.[13] In their studies, the base glasses differed in their alkalis. The smaller the atomic radius of the alkali the more diffuse is the absorption band. The fine structure of the rubidium glass gradually disappears when this large alkali is replace by the smaller potassium, sodium, or lithium ion. The corresponding lithium glass could be obtained only by rapid cooling; otherwise crystal-lization took place. Thus, there seems to be a general connection between the tendency of a glass to devitrify and its absorption spectrum. In all the glasses which crystallize readily Neodymium causes only a somewhat diffuse absorption spectrum.[14] Regardless of the alkali base of the underlying glass, the absorption of yellow light between 565 and 598 nanometers is seen in all samples of glass (see FIG. 1).[15]

Glasses containing Neodymium Oxide experience "dichroism". In artificial light, the Neodymium Oxide glass appears as a brilliant red. The color sensation not only varies with the type of illumination, but also with the thickness of the glass layer. In thin layers or with low concentrations of Neodymium Oxide these glasses are blue, in thick layers or with high concentration, red.[16]

V. Ctyroky made a study of the dichroism of glasses containing various concentrations of Neodymium and Vanadium. It was his attempt to calculate the thickness of the glass and the concentration of the colorants which produce the maximum dichroism. The color play of these glasses is caused by the Neodymium Oxide, for the Vanadium Oxide produces a green color which serves only to modify the original blue-red dichroism of the rare earth. The absorption of the yellow light between 565 and 598 nanometers is so intense that even a faintly colored Neodymium Oxide glass absorbs yellow light almost completely. Thus the transmitted spectra is divided into two parts, a blue one and a red one. The color sensation which such a glass produces depends on the intensity distribution of the light source. In daylight the blue part predominates; in artificial light (incandescent), which is relatively poor in short-wave radiation, the red predominates.[17]

Theoretically, it was to be expected that a filter having a sharp absorption band in the red and green basic sensation curves would lead to an increase in the saturation of practically all colors with medium saturation. An optimum improvement is obtained by an absorption band at 573 nanometers which falls in the middle of the Neodymium Oxide absorption band in glass.[18]

The characteristic absorption of a Neodymium Oxide glass, especially its narrow intense band in the yellow part of the spectrum, affects color vision in a unique way. Looking through such a glass at a landscape or a garden in bloom, the red and green hues are strongly accentuated; especially do all colors containing red stand out very clearly.[19]

Another interesting feature when looking through a Neodymium Oxide containing glass is the distinction between the green of vegetation and a similar green hue produced by the blending of inorganic pigments. Whereas the hues of both greens may be the same, the reflection spectra are fundamentally different in respect of their intensity distribution; for the chlorophyll of plants possesses a spectrum rich in fine structure.[20]

Bouma explains how the electric light (incandescent lamp) can be improved by the introduction of a colored envelope using a glass containing Neodymium Oxide, known as "Neophane" glass (for the purposes of clarity, an envelope refers to the outer shell of the lamp bulb). It is clear that large portions of the spectrum must not be weakened to any extent. Otherwise, there would be too great a decrease in the efficiency. Only an improvement of the color which can be obtained with a relatively slight loss of light can be considered.[21]

The only possibility thus consists of the absorption of one or more relatively small regions of the spectrum. The pertinent question is what colors may be considered in this connection? In general, absorption of a given color is accompanied by the following two objections:

1. An object which reflects almost exclusively this color appears too dark.
2. Objects which exhibit the color under consideration in a less saturated form will appear still less saturated.

The first objection holds primarily for the colors at the extremities of the spectrum, thus for red and blue. Very saturated red, for example, can only occur when a material reflects practically exclusively red and orange. The same is true for blue.

For yellow, the situation is different. Highly saturated yellow occurs in nature as a rule, not only because a narrow region of the spectrum is reflected, but because red and green as well as yellow are fairly well reflected, and only blue and violet are absorbed to a large extent.

The second objection also holds particularly at the extremities of the spectrum; the blue, which is reproduced in electric light in a much less saturated form than in daylight, may certainly not be made still duller. The saturation of the red may also not be decreased too much, since otherwise the reproduction of skin color would be made worse.

For the reasons mentioned above, the second objection is also of much less importance in the case of yellow.

Bouma surrounded an incandescent lamp with a bulb of the Neodymium Oxide containing Neophane glass, and compared the color rendition to an incandescent lamp surrounded by an ordinary opal glass bulb. His results indicated the majority of the colors become more saturated, a change which is to be desired, especially at relatively low levels of illumination. In particular, the blue, which upon changing from daylight to incandescent has become considerably less saturated is again reproduced in a more saturated form.

The orange is shifted toward the red: the shift in the direction yellow to red is in general experienced as an increased "warmth" of that color.

The green, which upon translation from daylight to incandescent light had become a somewhat dubious yellow-green, goes back to green again under the influence of the Neophane glass.

Finally, Bouma notes that white and the very unsaturated colors are shifted in the direction of blue-violet. This may certainly not be considered an advantage since however the change is not very great, and moreover since it lies almost in the same direction as the shift on transition from daylight to incandescent light, the shift is not disturbing.[22]

In summary, Bouma found that the use of the Neodymium Oxide containing Neophane glass has the advantage of reproducing most colors in a more saturated form and of making the orange-yellow warmer. Various disadvantages of incandescent: light, such as the faded appearance of blue and the shift of green towards yellow-green, are partially overcome. The most important advantage of the incandescent light such as the high saturation of the orange and of the colors in its neighborhood, the greater intensity of red, are retained.

Dannmeyer made an investigation of Neodymium Oxide containing Neophane glass as a vision aide in bad weather for navigational purposes.[23] If one looks at a spectrum through this glass, one will notice that yellow is eliminated, but red and green appear much clearer. If one looks at a landscape, even in murky weather, one will see wonderful lustrous colors, emphasizing everything red and even green. But there is another special effect: the discomforting blinding effect created primarily by yellow disappears at the same time. If one looks at the branches of a bare tree against a bright sky, one won't be able to see the ends. They disappear in the general glaze. If, however, one looks though the Neodymium Oxide glass—or as it is now technically called, Neophane glass—even the slightest differences are emphasized. All blinding effects against the clear sky or the sun, disappear and the elements of the optical picture appear more sharply even when looking toward the sunset and twilight pictures have more contrast.

As further noted by Dannmeyer,[24] the effects of using the Neodymium Oxide containing Neophane glass was studied during the summer and fall on the Elbe River and in the North and Baltic Seas. It was shown that clear sighting made red and green as already mentioned, especially clear. External identification of a ship by the color of its smoke stack, bottom paint, ensign and other elements was made much easier. If the weather was hazy or misty, so that one could see the other ship only as a silhouette grey against grey, color differences could still be seen that could not have been recognized with unaided sight. But what was immensely important was that ships that in hazy weather seemed to be the same distance apart, were seen to be at varied distances from one another; both location and movement were much easier to differentiate.

It is well known that on the Elbe, at sunset, outgoing ships looking into the sunset have on occasion had optical difficulties caused by the blinding of the sun. Markers are difficult to distinguish, and even though ship pilots are exceedingly well informed, discerning an oncoming ship is sometimes exceedingly difficult.

According to Dannmeyer, Neodymium Oxide containing Neophane glass prevents all of these things from happening to the eye. Along the lower Elbe one is able to distinguish a lengthening of the coast line even in hazy weather, and thus seeing distances are actually extended by about a nautical mile. On the North Sea, it is possible to make out various vessels that would not have been discernible in the misty weather. The grey of the vessels appears darker than the surroundings through the eyeglasses. In the reflection of the sinking sun, in which the eye could not distinguish objects, the vessels were clearly discerenible through the Neodymium Oxide containing Neophane glass.[24]

The aforementioned studies of Neodymium Oxide containing glass in window and indoor light bulb applications can be applied to the previously undiscovered use of the present invention for vehicular windshields and safety glazing material, for better vision during both daylight and night driving.

According to the present invention, when the Neodymium Oxide glass is used in a motor vehicle windshield and safety glazing material for both daylight, and night and bad weather driving, the discomforting undesirable yellow light is filter out, making objects more clear with improved contrast and color rendition. In addition, the eyestrain caused by the intense point sources of on-coming headlights coming from the opposite direction, is eliminated, ending once and for all the discomfort experienced from light from headlights coming from the opposite direction.

A physiological explanation of how the eye sees colors provides an explanation of the visual effectiveness of Neodymium Oxide doped glass for motor vehicle windshields and for safety glazing material. The following explanation is provided by Gouras:[25]

There are three cone mechanisms in the human visual system, with peak sensitivities near 440 nanometers in the blue-violet, 540 nanometers in the green, and 610 nanometers in the orange. These mechanisms are loosely called "blue", "green", and "red" processes in vision because they may be roughly thought of as being affected, respectively, by blue, green, and red light.

There are approximately 6 to 7 million green plus red cones per eye, and less than 1 million blue cones. The green and red cones contribute towards seeing fine detail and contrasts; the blue cones do not. The blue cones are through to provide, mainly, the means of distinguishing between yellow and light appearing objects; the blue-cone mechanism is excited by blue and light and inhibited by yellow light.

When mid-spectral (yellowish) images are in sharp focus on the retina, bluish wavelengths are out of focus. Low visual acuity is associated with the blue-cone mechanism, and high visual acuity with the green plus red cone mechanism. The term "yellowisn images" does not necessarily imply any yellow content in the light, since green plus red yields the sensation of yellow.

The cones feed their signals into various kinds of cells in and beyond the retina. Strongly cone opponent cells are those cells that are excited by one color of light and inhibited by another. The "red-green contrast detectors" contribute heavily to both luminance and color contrast, and also to the detection of differences between elements of a scene. They supply information on fine spatial detail.

The strongly cone-opponent cells (associated with the green and red cones) are turned off or on by green or red light, and are very unresponsive to yellow light. The red-green contrast detector is totally inhibited by yellow light.[26]

Thus, a motor vehicle windshield and safety glazing material with Neodymium Oxide containing glass appears to provide the maiximal filtering effect of the discomforting yellow light in order to improve contrast, visual acuity, and color recognition.

Two recent studies of the functioning of the eye for people of low vision are of interest. Neodymium Oxide type motor vehicle windshields and safety glazing material will be of help not only to people who have normal vision, but also to people who may be visually impaired.

Faye reports that the visual impression in viewing colored objects is a vivid "true" color similar to the view in full sunlight.[27] In viewing high contrast acuity charts, contrast sensitivity charts (Vistech VCTS 6500), and reading material, there is an increased contrast between black and white, when incandescent light bulbs containing Neodymium Oxide are used indoors. White appears whiter and black blacker because of the decrease yellow emission of the Neodymium Oxide containing bulb.

To date, while no specific recommendations can be made, it appears that a history from visually impaired patients that they need sunlight for best reading (or can't read by artificial light), indicates a favorable response to the Neodymium Oxide containing light bulbs. Favorable responses have been elicited from patients with retinitis pigmentosa, optic atrophy, glaucoma with visual field effects, and diabetes with proliferative retinopathy who have undergone panretinal photocoagulation.

A study of low vision patients was conducted by Cohen and Rosenthal at the State University of New York School of Optometry in New York City.[28] Their study also found more accurate color rendering and an improvement in visual acuity, contrast, and a reduction in eye fatigue. Tests were conducted on 51 low vision patients using standard incandescent lamps and standard "A" type Neodymium Oxide lamps on the Vistech 6000 Contrast Test and high and low contrast acuity charts. Results showed a small, but statistically significant performance enhancement when using Neodymium Oxide bulbs. Subjective preference also favored the Neodymium Oxide bulbs in a 5 to 1 ratio when a preference was present. The patient population had such pathologies such as achromotopsia, albinism, cataracts, congenital cataracts with aphakia, cortical anoxia, diabetic retinopathy, optic atrophy, pathological myopia, primary nystagmus, retinitis pigmentosa, POP, and SMD.

As a result, it is shown that the use of Neodymium Oxide as a doping agent in the glass of a motor vehicle windshield and safety glazing material will filter out yellow light, thus favoring vision promoting red-green contrast detectors, to improve visual contrast, visual acuity, and better color recognition.

Reference

1. David R. Lide, editor; *Handbook of Chemistry and Physics*; 73rd edition; CRC Press; Ann Arbor, Mich.; 1992. p. 4–18, 4–77.
2. Weeks, Mary Elvira; *Discovery of the Elements*; Journal of Chemical Education; 6th Edition; 1960; p. 552.
3. Moeller, Therald; *The Chemistry of the Lanthanides*; Reinhold Publishing Company; New York, N.Y.; 1963; pp. 1–4.
4. Weeks; p. 701.
5. *Ibid.*, p. 704.
6. *Ibid.*, p. 713.
7. *Ibid.*, p. 714.
8. Hufner, S.; "Optical Spectroscopy of Lanthanides in Crystalline Matrix"; in *Systematics and the Properties of the Lanthanides*; edited by Shyama P. Sinha; 1983; p. 313.
9. *Ibid.*, p. 372.
10. Weyl, Woldemar A.; *Coloured Glasses*; Dawson's of Pall Mall; London; 1959; p. 220.
11. *Ibid.*, p. 219.
12. Weidert, F.; "Das Absorptionsspektrum von Didymglasern bei verschiendenartiger Zusammensetzung des Grundglases"; Zeithschrift f. wiss. Photog.; 1921–22; Vol. 21; pp. 254–264.
13. Weyl, Woldemar A., and Evelyn Chostner Marboe; *The Constitution of Glasses*, Vol. 1; Interscience Publishers, a division of John Wiley & Sons; New York, N.Y.; 1962; p. 315.
14. Weyl, Coloured Glasses, p. 77.
15. *Ibid.*, P. 78.
16. *Ibid.*, P. 221.
17. *Ibid.*, P. 221–222.
18. *Ibid.*, P. 226
19. *Ibid.*
20. *Ibid.*
21. Bouma, P. J.; The Colour Reproduction of Incandescent Lamps and "Philiphane Glass"; Philips Technical Review; 1938; Vol. 3; pp. 27–29.
22. *Ibid.*
23. Dannmeyer, F.; "Das Neophanglas als nautisches Hilfsmittel bei unklarer Sicht"; Die Glashutte; 1934; Number 4; pp. 49–50.
24. *Ibid.*
25. Gouras, P. and E. Zrenner; "Color Vision: A Review from a Neurophysiological Perspective"; in *Progress in Sensory Phvsiology* 1; Springer-Verlag, Berlin-Heidelberg-New York, 1981.
26. *Ibid.*
27. Faye, Eleanor; "A New Light Source"; The New York Association for the Blind; New York, N.Y.; undated; one page.
28. Cohen, Jay M. and Bruce P. Rosenthal; "An Evaluation of an Incandescent Neodymium Light Source on Near Point Performance of a Low Light Vision Population"; Journal of Visual Rehabilitation; Vol. 2, No. 4; 1988; pp. 15–21.

SUMMARY OF THE INVENTION

The present invention is for a Neodymium Oxide doped windshield and safety glazing material which will provide a significant improvement in visual performance, color rendition, and contrast of objects being seen.

The transmittance of light through glass is governed by the Lambert-Beers Law, which relates the amount of light transmitted through a certain thickness of glass by an absorption coefficient:

$$Ln(T) = -AL$$

In the above equation, L is the thickness of the glass, A is the absorption coefficient, T is the percentage of light being transmitted, and Ln represents the natural logarithm.

For the purpose of manufacturing Neodymium Oxide containing glasses, the Neodymium Oxide must be reasonably pure. Impurities can reduce transmittance of light other than yellow, which is absorbed by the Neodymium Oxide.

The use of Neodymium Oxide as an ingredient in glass making, especially for the production of millions, if not tens of millions of square feet of glass motor vehicle windshields and safety glazing materials, requires a substantial quantity of Neodymium Oxide of purity of 96.0 to 99.0 percent. The absorption properties of Neodymium Oxide containing glasses were known prior to World War II. However, the cost of producing reasonably pure Neodymium Oxide was quite high, because the chemical properties of the lanthanides are similar, and separation is difficult. During World War II, while working on the separation of the fission products as part of the atomic bomb project, scientists developed the elution chromagraphic ion exchange method for separating the rare earth elements. A major breakthrough occurred in the 1950's when Frank H. Spedding and co-workers developed the band-displacement ion exchange method, which was capable of producing macro quantities of extremely pure individual elements. Within 10 years, liquid-liquid extraction methods were developed which provided even lower priced individual rare earth elements.

Thus, it is possible to manufacture Neodymium Oxide containing windshields and safety glazing material that does not add significantly to the price of a new motor vehicle, and the Neodymium Oxide containing motor vehicle windshields and safety glazing material can be reasonably priced to compete in the aftermarket.

DESCRIPTION OF THE DRAWINGS

The invention can be best understood with reference to the following drawings in which.

DETAILED DESCRIPTION OF THE DRAWINGS

Figure 1:
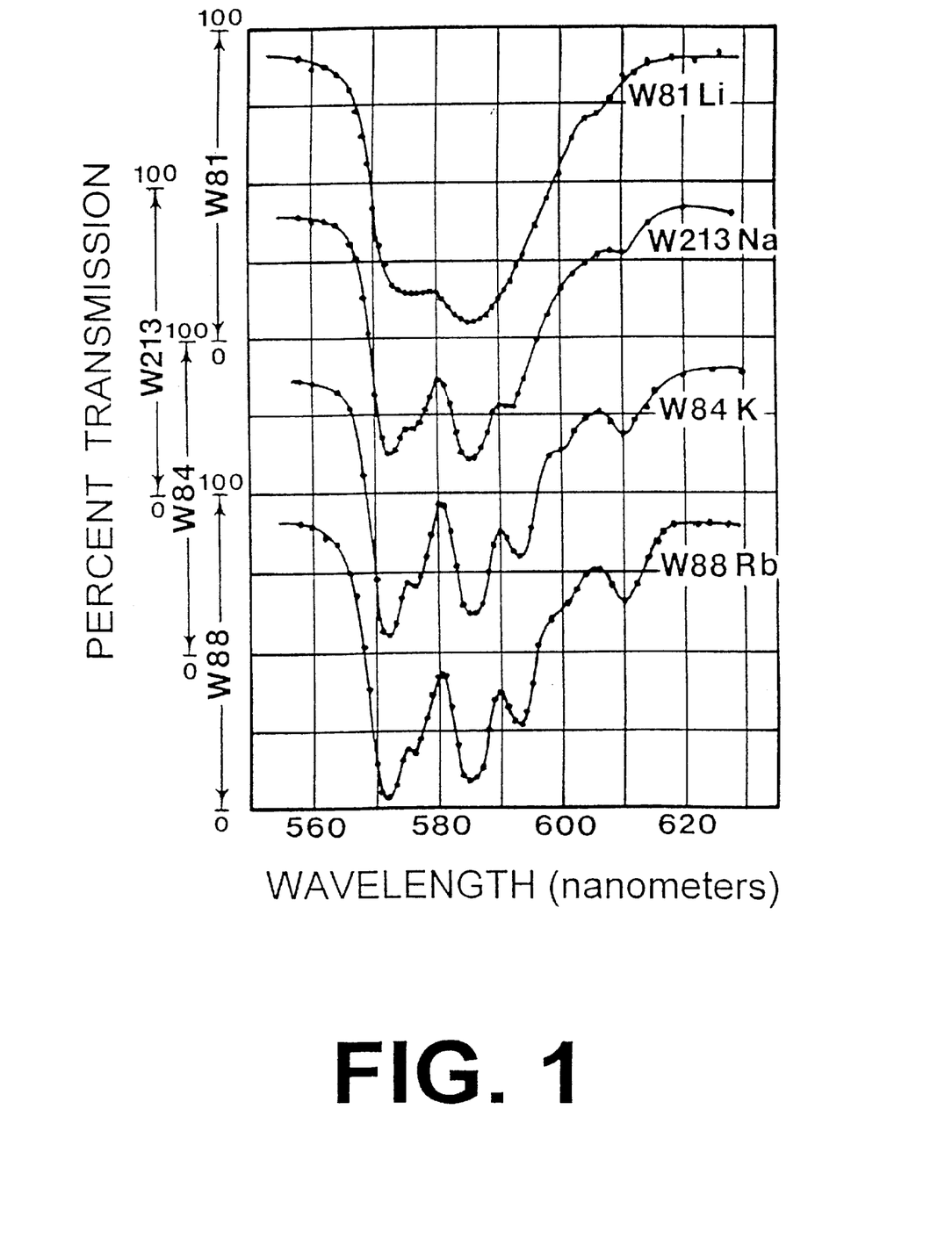
FIG. 1 is a graph comparing the transmittance of a number of Neodymium Oxide containing glasses.

FIG. 1 shows the transmission of light of various glasses containing Neodymium Oxide. It is shown that the smaller the atomic radius of the alkali, the more diffuse is the absorption band. The fine structure of the rubidium glass gradually disappears when this large alkali is replaced by the smaller potassium, sodium, or lithium ion. The importance for the invention at hand is that regardless of the base tape of the glass. the absorption of yellow light between 565 and 598 nanometers is seen in all samples of class. It is seen that the W87 lithium base Neodymium Oxide glass is absorbing 95 percent of the yellow light at 585 nanometers.

Figure 2:
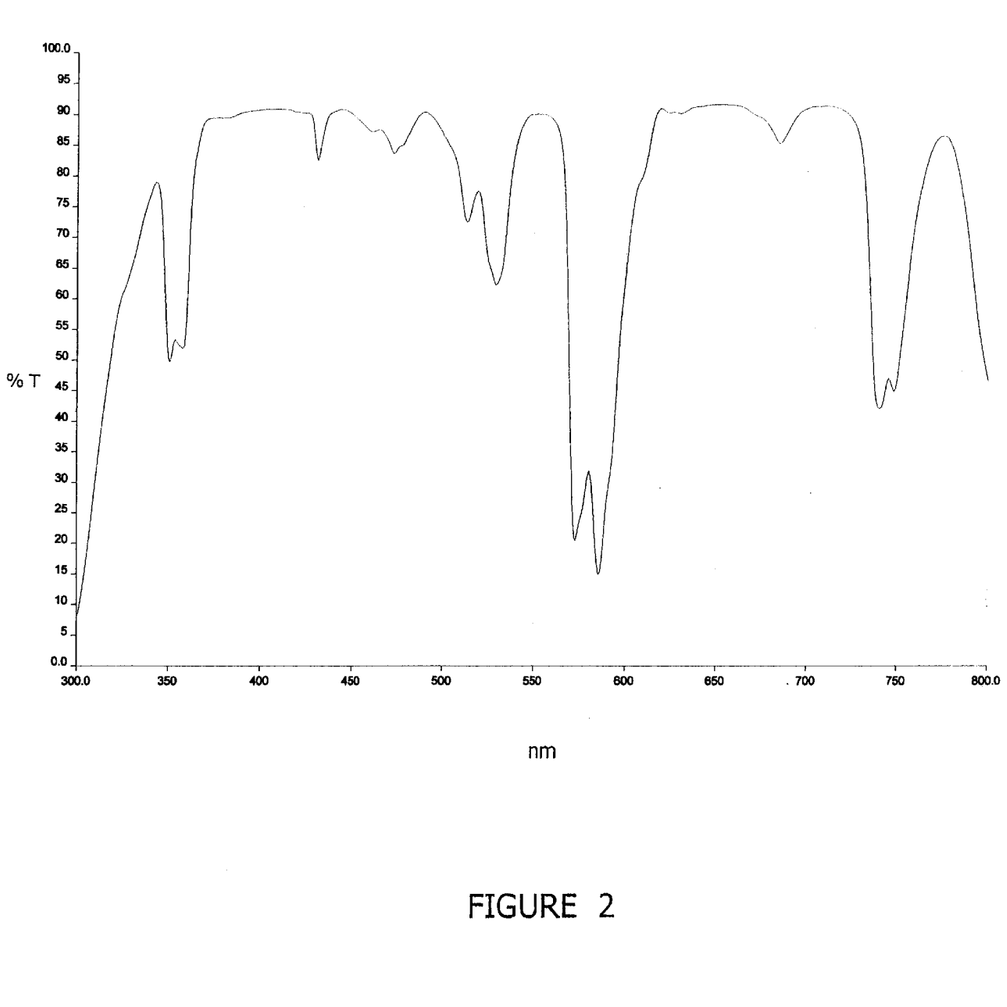
FIG. 2 is a graph of a light transmission curve of a Neodymium Oxide doped glass with a total light transmittance of 70.08 percent, which would satisfy the requirements of 49 CFR 571.205 and ANSI/SAE Z26.1-1996 for motor vehicle windshields and safety glazing material.

FIG. 2 is a light transmittance curve of a piece of Neodymium Oxide doped glass with a total light transmittance of 70.08 percent as supplied by Schott Glass Technologies, Inc., of Duryea, Pa. This glass is doped at 0.0221 grams of Neodymium Oxide per square centimeter of surface area. At 584 nanometers, the light transmittance is 15 percent; thus the glass is filtering out 85 percent of the yellow light. This glass satisfies the requirement of 49 CFR 571.205 and ANSI/SAE Z26.1-1996, for motor vehicle windshields and safety glazing material, which requires a regular (parallel) luminous transmittance of not less than 70 percent.

Figure 3:
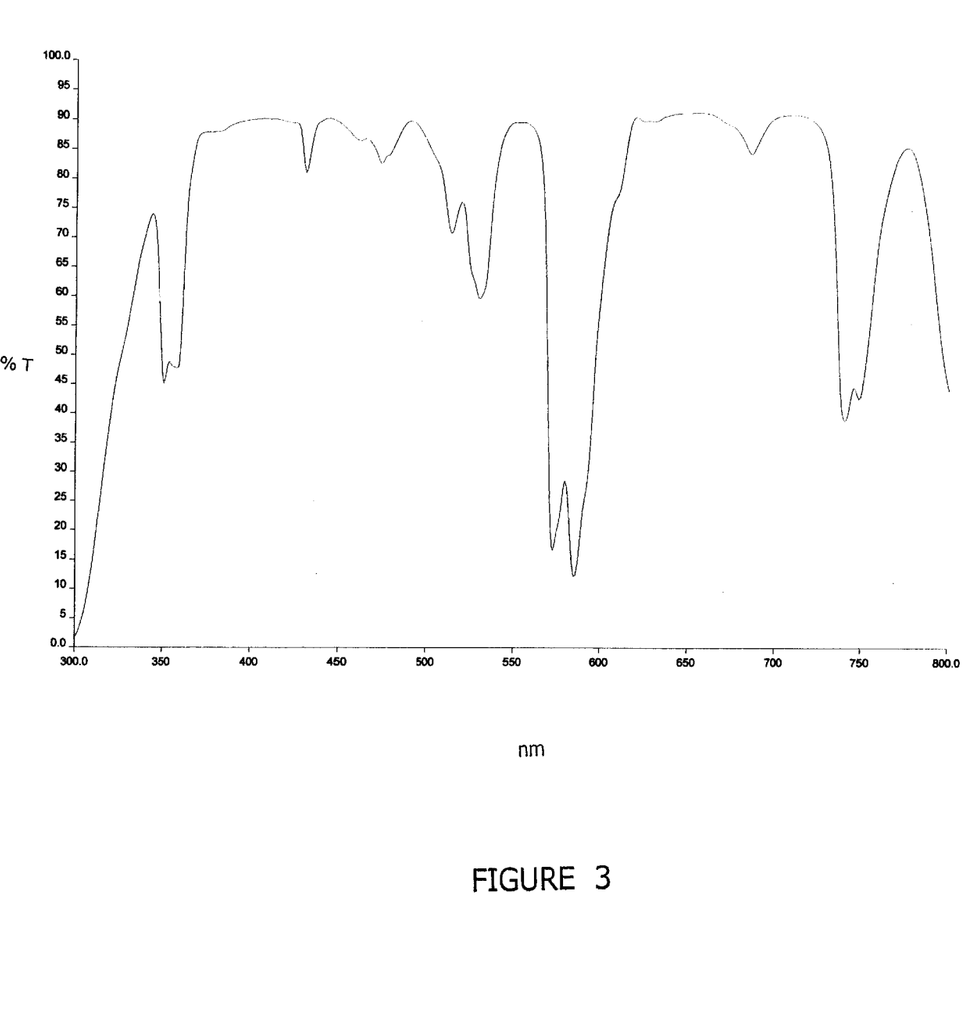
FIG. 3 is a graph of a light transmission curve of a Neodymium Oxide doped glass with a total light transmittance of 62.46 percent, which would satisfy the requirements for safety glazing materials for use in bullet resistant shields as per 49 CFR 571.205 and ANSI/SAE Z26.1-1996.

FIG. 3 is a light transmittance curve of a piece of Neodymium Oxide doped glass with a total light transmittance of 62.46 percent, as provided by Schott Glass Technologies, Inc., of Duryea, Pa. This glass is doped at 0.0356 grams of Neodymium Oxide per square centimeter of surface area. At 584 nanometers, the light transmittance is 12.5 percent; thus the glass is filtering out 87.5 percent of the yellow light. This glass satisfies the requirements of 49 CFR 571.205 and ANSI/SAE Z26.1-1996, for safety glazing materials for use in bullet resistant shields, which requires a combined (parallel) luminous transmittance at normal incidence through both the shield and the permanent vehicle glazing of at least 60 percent.

Figure 4:
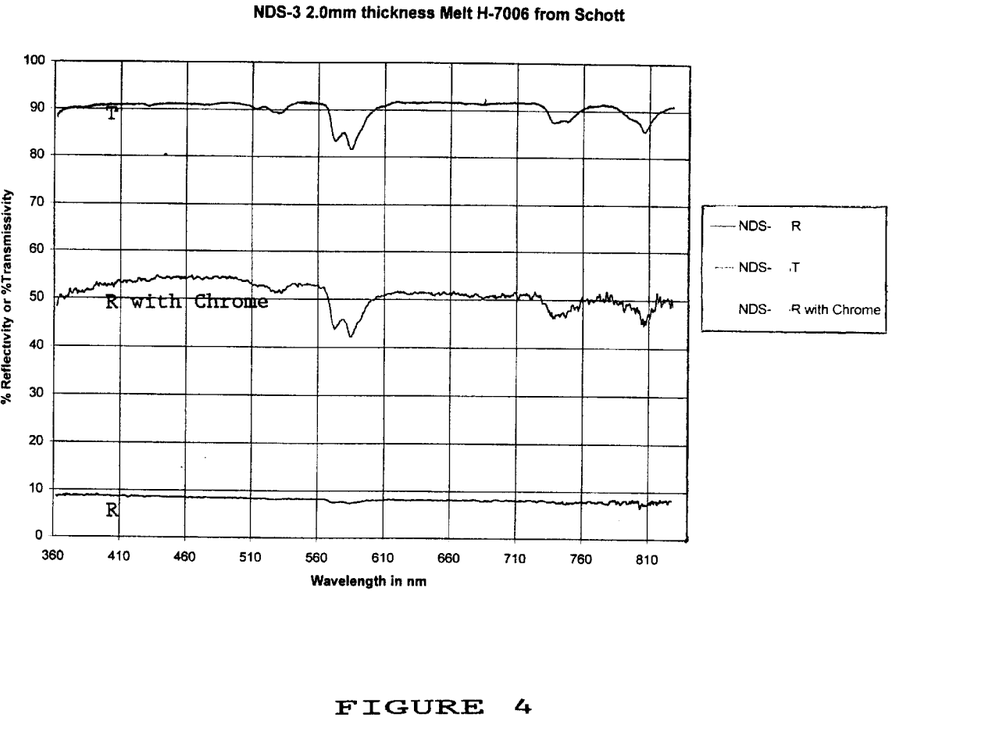
FIG. 4 is a graph of a light transmission curve of a Neodymium Oxide doped glass with a total light transmittance of 89 percent, which would satisfy the requirements for motor vehicle windshields and safety glazing materials as per 49 CFR 571.205 and ANSI/SAE z26.1-1996.

FIG. 4 is a graph showing three light transmission and reflection curves. The top curve, which is the curve of interest, is a light transmission curve for a piece of Neodymium Oxide doped glass with a total light transmittance of 89 percent. It is labeled "T" on the graph. The glass was supplied by Schott Glass Technologies, Inc, of Duryea, Pa., and the graphs were produced by Gentex Corporation, Zeeland, Michigan. This glass is doped at 0.00524 grams of Neodymium Oxide per square centimeter of surface area. At 584.5 nanometers, according to data supplied by Gentex Corporation, the light transmission is at a minimum and it is 81.67 percent; thus the glass is filtering out 18.33 percent of the yellow light at that frequency. This glass satisfies the requirements of 49 CFR 571.205 and ANSI/SAE Z26.1-1996 for motor vehicle windshields, safety glazing material, and for safety glazing material for use in bullet resistant shields.

DETAILED DESCRIPTION OF THE PREFERRIED EMBODIMENT

The present invention constitutes a Neodymium Oxide containing glass windshield and safety glazing material to filter out much of the yellow light between 565 and 598 nanometers.

As shown in FIG. 2, a piece of Neodymium Oxide doped glass with 0.0221 grams of Neodymium Oxide per square centimeter has a total light transmittance of 70.08 percent. A doping level above this amount would result in a total light transmittance below 70 percent, which would be in violation of 49 CFR 571.205 and ANSI/SAE Z26.1-1996. In the preferred embodiment, the amount of Neodymium Oxide doping is kept below 0.0225 grams of Neodymium Oxide per square centimeter of glass surface.

At 584 nanometers, the glass absorbs 85 percent of the yellow light at that wavelength, and transmits 15 percent. It is important that a certain amount of yellow light be transmitted through the Neodymium Oxide containing glass so that objects with a predominant color in the yellow can be seen through the Neodymium Oxide doped windshield and safety glazing material. The minimum transmittance occurs at 584 nanometers. Additionally, it is imperative that yellow traffic signals be seen, as well as yellow and orange caution lights and warning signs. In the preferred emobodiment, the transmission of light at 584 nanometers is kept to a minimum of 15 percent and the absorption of light at 584 nanometers is kept to a maximum of 85 percent.

As shown in FIG. 3, a piece of Neodymium Oxide doped glass with 0.0356 grams of Neodymium Oxide per square centimeter has a total light transmittance of 62.46 percent. A doping level above 0.040 grams of Neodymium Oxide per square centimeter of surface area would result in a total light transmittance of below 60 percent, which would be in violation of 49 CFR 571.205 and ANSI/SAE Z26.1-1996 for safety glazing materials for use in bullet resistant shields. In the preferred embodiment, the amount of Neodymium Oxide is kept below 0.040 grams of Neodymium Oxide per square centimeter of surface area.

As also in FIG. 3, the glass absorbs 87.5 percent of the yellow light at 584 nanometers, and transmits 12.5 percent of the yellow light at that wavelength. It is important that a certain amount of yellow light be transmitted through the Neodymium Oxide containing glass so that objects with a predominant color in the yellow can be seen through the Neodymium Oxide containing safety glazing material for use in bullet resistant shields. The minimum transmittance occurs at 584 nanometers. Additionally, it is imperative that yellow traffic signals be seen, as well as yellow and orange caution lights and warning signs. In the preferred embodiment, the transmission of light at 584 nanometers is kept to a minimum of 12.5 percent and the absorption of light at 584 nanometers is kept to a maximum of 87.5 percent.

As to the maximum percentage of Neodymium Oxide being present in the windshield glass and the safety glazing material, there is an upper limit. For example, according to U.S. Pat. No. 5,077,240 of Hayden, discussed in the "Background and Theory of the Invention" herein, glass can be included doped therein Neodymium Oxide at a maximum concentration of 30 percent by weight. Otherwise, devitrification of the glass would occur. In actual practice, the concentration of Neodymium Oxide will vary with the thickness of the glass in the motor vehicle windshield and safety glazing materials.

Moreover, when less than the maximum amount of Neodymium Oxide is present in the glass, the filtering out of the yellow light between 565 and 598 nanometers is decreased. However, even minimal amounts of Neodymium Oxide will have a reduction in the amount of yellow light transmitted through the glass. For example, FIG. 4 shows the light transmission curve of a glass containing just 0.00524 grams of Neodymium Oxide per square centimeter of surface area. At 584.5 nanometers, the light transmission is minimized at 81.67 percent; thus the glass is filtering out 18.33 percent of the yellow light at that frequency. The total light transmittance of this glass is 89 percent, and it satisfies the requirements of 49 CFR 571.205 and ANSI/SAE Z26.1-1996 for motor vehicle windshields, safety glazing material, and for safety glazing materials for use in bullet resistant shields.

The Neodymium Oxide doped windshield, safety glazing material, and safety glazing material for use in bullet resistant shields can be used in such vehicles as an automobile, a truck, a bus, a motorcycle, a locomotive, a sport utility vehicle, and all terrain vehicle, and a van.

Modifications may be made to the method used for making the device, the device itself as well as the process described above for the Neodymium Oxide doped motor vehicle windshield, safety glazing material, and safety glazing material for use in bullet resistant shields without departing from the spirit and scope of the invention as exemplified in the appended claims.

I claim:

1. A motor vehicle windshield, and a means for reducing the amount of transmitted yellow light in the range of 565 to 598 nanometers by up to 85 percent, said means for reducing the amount of transmitted yellow light in the range of 565 to 598 nanometers comprising said motor vehicle windshield including glass material containing Neodymium Oxide up to 0.0225 grams per square centimeter of glass area.

2. The motor vehicle windshield as in claim 1 wherein the motor vehicle windshield is a motor vehicle windshield for an automobile.

3. The motor vehicle windshield as in claim 1 wherein the motor vehicle windshield is a motor vehicle windshield for a truck.

4. The motor vehicle windshield as in claim 1 wherein the motor vehicle windshield is a motor vehicle windshield for a bus.

5. The motor vehicle windshield as in claim 1 wherein the motor vehicle windshield is a motor vehicle windshield for a motorcycle.

6. The motor vehicle windshield as in claim 1 wherein the motor vehicle windshield is a motor vehicle windshield for a locomotive.

7. The motor vehicle windshield as in claim 1 wherein the motor vehicle windshield is a motor vehicle windshield for a sport utility vehicle.

8. The motor vehicle windshield as in claim 1 wherein the motor vehicle windshield is a motor vehicle windshield for an all terrain vehicle.

9. The motor vehicle windshield as in claim 1 wherein the motor vehicle windshield is a motor vehicle windshield for a van.

10. Safety vehicle glazing, and a means for reducing the amount of transmitted yellow light in the range of 565 to 598 nanometers by up to 85 percent, said means for reducing the amount of transmitted yellow light in the range of 565 to 598 nanometers comprising said safety glazing material including glass material containing Neodymium Oxide up to 0.0225 grams per square centimeter of glass area.

11. The safety glazing material as in claim 10 wherein the safety glazing material is safety glazing material for an automobile.

12. The safety glazing material as in claim 10 wherein the safety glazing material is safety glazing material for a truck.

13. The safety glazing material as in claim 10 wherein the safety glazing material is safety glazing material for a bus.

14. The safety glazing material as in claim 10 wherein the safety glazing material is safety glazing material for a motorcycle.

15. The safety glazing material as in claim 10 wherein the safety glazing material is safety glazing material for a locomotive.

16. The safety glazing material as in claim 10 wherein the safety glazing material is safety glazing material for a sport utility vehicle.

17. The safety glazing material as in claim 10 wherein the safety glazing material is safety glazing material for an all terrain vehicle.

18. The safety glazing material as in claim 10 wherein the safety glazing material is safety glazing material for a van.

19. Safety glazing material for use in bullet resistant shields, and a means for reducing the amount of transmitted yellow light in the range of 565 to 598 nanometers by up to 87.5 percent, said means for reducing the amount of transmitted yellow light in the range of 565 to 598 nanometers comprising said safety glazing material for use in bullet resistant shields including glass material containing Neodymium Oxide up to 0.040 grams per square centimeter of glass area.

20. The safety glazing material for use in bullet resistant shields as in claim 19 wherein the safety glazing material for use in bullet resistant shields is safety glazing material for use in bullet resistant shields for an automobile.

21. The safety glazing material for use in bullet resistant shields as in claim 19 wherein the safety glazing material for use in bullet resistant shields is safety glazing material for use in bullet resistant shields for a truck.

22. The safety glazing material for use in bullet resistant shields as in claim 19 wherein the safety glazing material for use in bullet resistant shields is safety glazing material for use in bullet resistant shields for a bus.

23. The safety glazing material for use in bullet resistant shields as in claim 19 wherein the safety glazing material for use in bullet resistant shields is safety glazing material for use in bullet resistant shields for a motorcycle.

24. The safety glazing material for use in bullet resistant shields as in claim 19 wherein the safety glazing material for use in bullet resistant shields is safety glazing material for use in bullet resistant shields for a locomotive.

25. The safety glazing material for use in bullet resistant shields as in claim 19 wherein the safety glazing material for use in bullet resistant shields is safety glazing material for use in bullet resistant shields for a sport utility vehicle.

26. The safety glazing material for use in bullet resistant shields as in claim 19 wherein the safety glazing material for use in bullet resistant shields is safety glazing material for use in bullet resistant shields for an all terrain vehicle.

27. The safety glazing material for use in bullet resistant shields as in claim 19 wherein the safety glazing material for use in bullet resistant shields is safety glazing material for use in bullet resistant shields for a van.

* * * * *